2 Sheets--Sheet 2.
No. 120,439.
Garrett Z. House,
Patented Oct. 31, 1871.
Imp'd Oven, Heating and Cooling Drum.
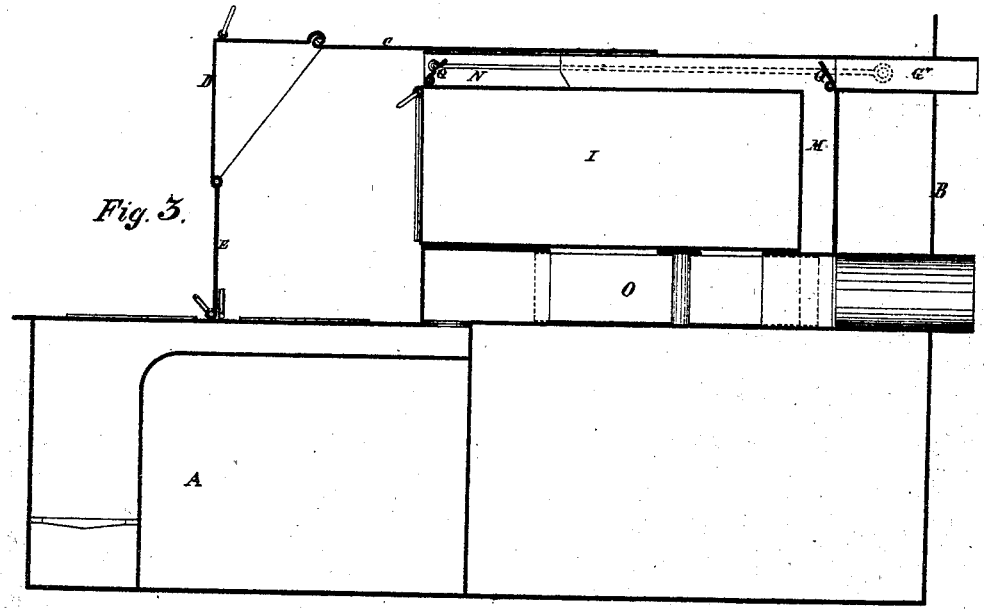
Fig. 3.
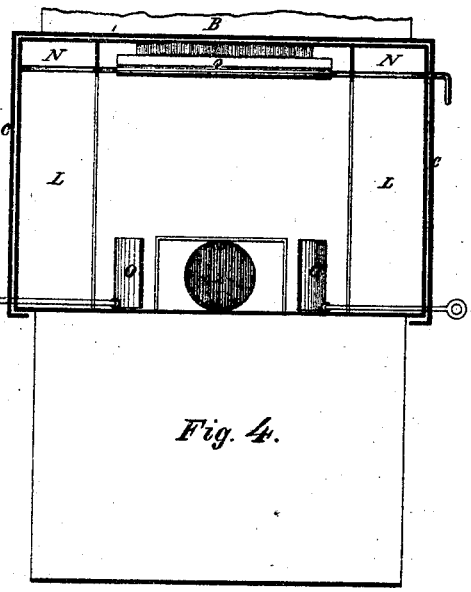
Fig. 4.
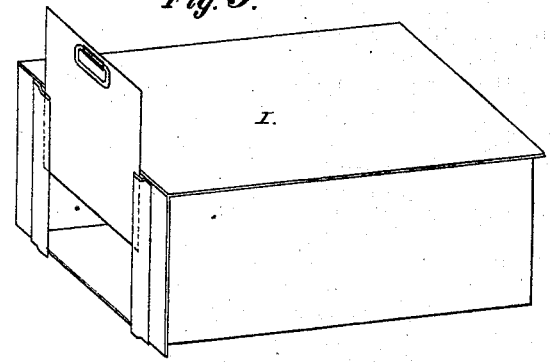
Fig. 5.
Fig. 6.
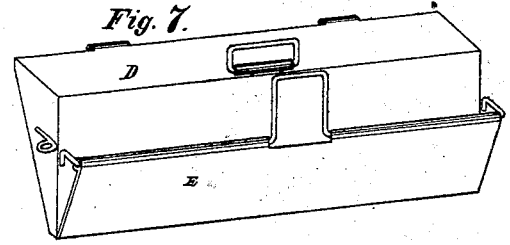
Fig. 7.
Witnesses:
Emanuel P. Llenge
John Germann
Inventor:
Garrett Z. House

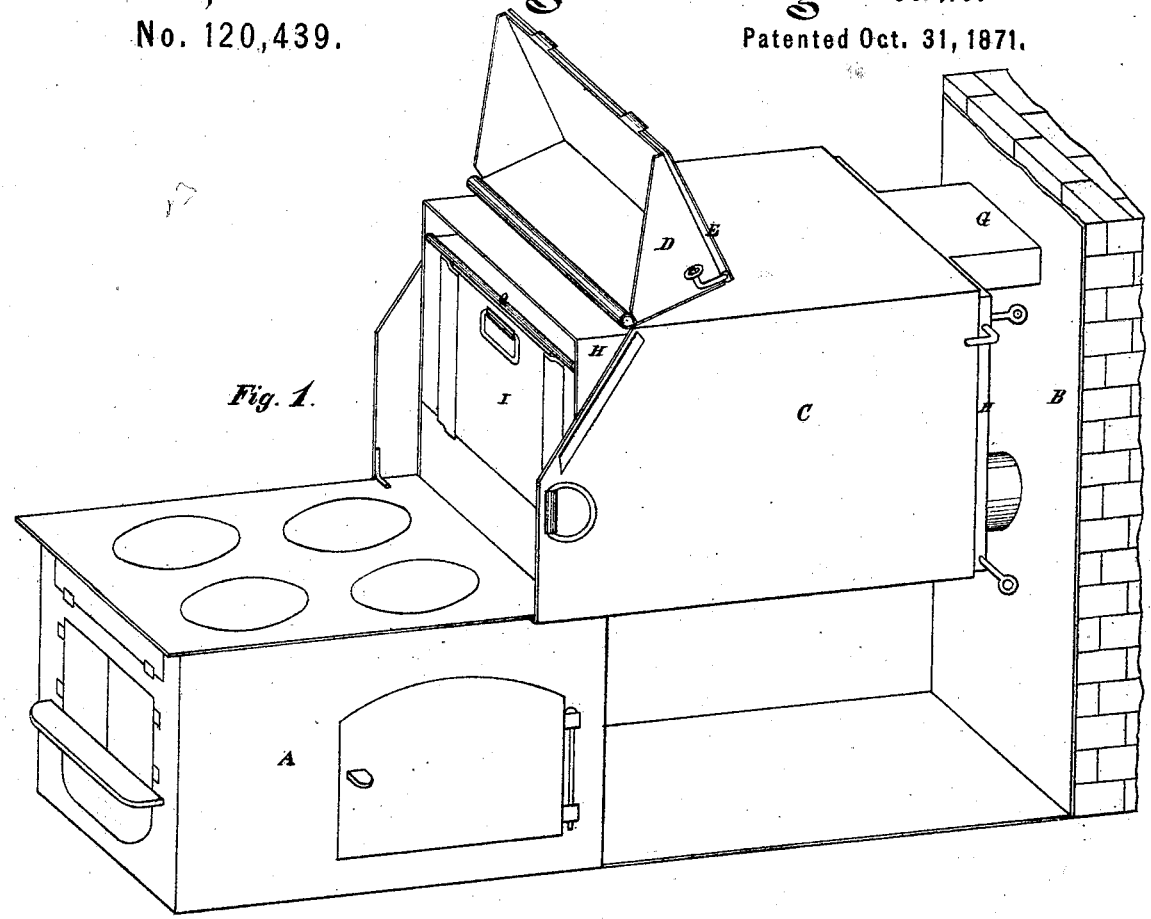
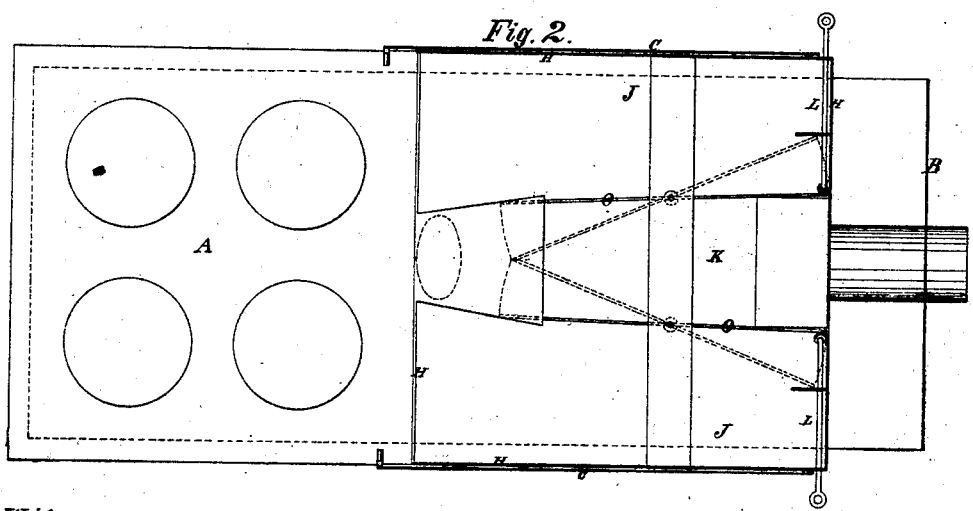

UNITED STATES PATENT OFFICE.

GARRETT Z. HOUSE, OF NEW YORK, N. Y.

IMPROVEMENT IN COOKING-STOVES.

Specification forming part of Letters Patent No. 120,439, dated October 31, 1871.

*To all whom it may concern:*

Be it known that I, GARRETT Z. HOUSE, of the city, county, and State of New York, have invented certain Improvements in the Construction and Combination of Stove and Furnace-Ovens and Drums, of which the following is a specification:

I. The first part of my invention consists of a movable drum, as shown in drawing, setting upon the stove, and made to slide back or forward and over the stove when required, receiving and conducting off all the smoke, steam, and grease produced from cooking, and also receiving and conducting off the heat and gas from the top of the stove up the chimney in summer and when required, thus preventing their escape into the room, and removing at any moment the heat of the stove and passing it up the chimney; the object of this part of my invention being to dispense with or remove from the room all smoke, steam, gas, and disagreeable odor produced by cooking, and also to conduct the heat from the stove in hot weather up the chimney and preventing the escape into the room. The further object is also, when desired either for cooking or other purposes, to confine the heat from the top of the stove around and over the victuals, thus saving the great proportion which otherwise escapes. I find, by experiment and practical use of this appliance for over a year's constant use in my family, that a kettle of water placed under this drum will boil in less than half the time required when heat is allowed to escape into the room, and that one-third of the amount of fuel will be required to cook a meal and less than half the time, dispensing with the annoyance of suffocating heat in a hot summer's day. This movable drum consists of the main drum C C, with the hinged capped lid D D and drop-lid E, as described in drawing and general description attached, passing over the back drum and oven hereinafter described, and conducting the heat and smoke through the flue G, as above described.

II. The second part of my invention consists of an improvement of heating-drums and ovens, applicable to all stoves and ranges, and made to sit over and attach to the upper and back edge of the stove, furnishing a large and serviceable oven and at the same time a large heating-drum, exposing, when required, ten large heating-surfaces (being both inside and outside surfaces) to the atmosphere of the room, and possessing double the heating qualities of an ordinary drum of the same size; at the same time being so constructed as to shut off the entire heat from all the heating-surfaces when required, and conducting the heat through a direct narrow passage or flue into the chimney or pipe, leaving the drum and oven unaffected. This heating-drum and oven are so constructed and placed upon the stove as not in any way to interfere with the passage of the heat through an ordinary stove or range, or around the oven, or in any way to interfere with the water-pipes and heating-boilers which may be attached. The heat is received only at the shank of the stove-pipe, before entering the pipe or chimney and after leaving the stove, and is delivered at the rear end of this drum, through an ordinary pipe or flue, either into a stove-pipe or chimney; and is equally applicable to a city or country dwelling, delivering the smoke through the flue in the fire-board or through a stove-pipe into the chimney. When the smoke and heat are delivered into a stove-pipe the pipe is to be attached to the upper and back end of the stationary drum, connecting directly with the smoke-flues of the same. This drum consists of the main drum H H, made plain, of sheet-iron or other suitable material, of a size desired and to suit any size or style of stove or range, the sides or walls of oven I I being made to fit and slide in the drum H H, forming the air-chambers and flues J J, K, L L, M, and N, thus forming perfect air-chambers at the bottom, top, sides, and ends of the drum; also circulating the heat entirely over the bottom, top, sides, and end of the oven when desired. When the dampers at the end of drum O O are pushed in, and the dampers Q Q over the top of oven are open, the heat will pass through the shank of stove-pipe into flue K, and thus directly into the stove-pipe or chimney, and also the hot air and smoke from the top of the stove off through the air-chamber over the oven, and so off into the pipe or chimney. When it is desired to heat the oven and room, the dampers O O should be drawn out and the dampers Q Q at front and back of the air-chamber closed. The heat is then thrown direct from the fire around and over the top, bottom, sides, and back of the oven; and by drawing drum C C forward and shutting down the lid D and E all the heat direct from the top of the stove may be thrown into the front door of the oven. When it is desired to heat the room the heat should be thrown into the chambers of the drum around the oven, and the oven-door of the drum left open, allowing the heat from the inside of drum or oven to escape into the room. The oven of drum is made to slide out and in the same when required for cleaning the drum of ashes or when desired for other purposes.

Figure 1 is a perspective front and side view of the stove, with the stationary and sliding drums, the sliding drum being shoved back over the stationary drum, and the capped lid belonging to sliding drum turned backward and upward on sliding drum, with hinged portion folded on cap-lid; also showing the front of movable oven, with door closed, and the conducting-flue over the oven for the passage of smoke, steam, grease, and odor from victuals, and top of stove while cooking, open. A represents the stove, with lids, doors, &c. The legs of stove are left off. B represents the fire-board or chimney, into which smoke and hot air are conducted and carried off. C represents the movable drum, shutting over the stationary drum and sliding backward and forward over stove, cutting off and carrying off all the smoke, steam, heat, and odor from the victuals while cooking and from the top of the stove in summer and hot weather, when desired. D represents the capped lid of the movable drum hinged to and folded back on same, and made to shut down when desired to conduct off the heat, steam, and smoke from stove and drum. E represents the drop-lid folded back on capped lid and attached by fastening-hook. H represents the main stationary drum, containing oven, and nearly covered in cut by the movable drum C. I represents the movable oven in stationary drum, and, with front door removed, forms the hollow drum, presenting double heating-surfaces.

Fig. 2 represents a horizontal section of stationary drum below the oven, showing dampers, with direct discharge of smoke and heat into chimney or stove-pipe, and also showing their movement, by dotted lines, in preventing a direct discharge, and throwing heat up sides, back, over and around oven, when desired. J J are side flues under movable oven, and leading into air-chambers at sides and top of oven. K represents direct air-flue or passage for smoke leading direct from stove to chimney. L L represent air-chambers or flues at back end and sides of oven leading up back of oven from air-chambers below the oven, up back, and connecting with those above the oven. O O represent the dampers conducting heat direct to chimney, or cutting it off and throwing it under, around, and over the oven.

Fig. 3 represents a longitudinal section of stationary and movable drum with oven, with movable drum drawn partially over stove, showing oven and drums, with hot-air chambers and flues over, under, and back of oven, with smoke-flue and hot-air flue leading into fire-board or chimney, with capped lid and drop-lid turned down. M represents the air-flue or chamber at back end of oven, in center. N N represents the flues on top of oven, with the dampers to admit or cut off heat, smoke, and odor from top of stove and conducting the same up chimney when desired. O O represent the dampers at each end of flues N N, permitting or preventing escape of heat and odor, as stated in specification of claims herein.

Fig. 4 represents a section of stationary drum taken from the extreme rear end, showing rear vertical flues for conducting heat and smoke up back end and around the oven and drum; also showing the rear hot-air chamber or flues at top of oven, with action of dampers, &c. Q represents the damper in an air-flue over the oven, leading into the fire-board or chimney, half open. The other letters in this diagram have been explained in former figures.

Fig. 5 represents a perspective view of the oven removed from the stationary drum, showing the sliding door of oven half open and the recessed sides of same, forming when in drum air-chambers for heating oven or room when required. I represents this movable oven.

Fig. 6 represents the lock-hinge connecting capped lid to movable drum, and forming a perfectly smoke-and-steam-tight joint the entire length of lid, leaving both surfaces of cover smooth.

Fig. 7 represents hook and hinge-fastening attached to drop-lid in front of movable drum, and which fastens the same up against the capped lid or down to the movable drum, when desired.

I claim—

1. The dampers O O hinged centrally, and arranged so as to operate as herein described and set forth.

2. The dampers Q Q arranged in combination with passage N and M and oven I, so as to operate as described and set forth.

3. The cap-door D hinged to the drum C, arranged and operating as described and set forth.

4. The combination of the cap-door D and drop-lid E, as described and set forth.

5. The combination and arrangement of the movable drum C, the stationary drum H, the movable oven I, the cap-lid D, the drop-lid E, constructed and arranged as described and set forth.

6. The combination of fastening-hooks and handle on drop-lid E, arranged to operate as described and set forth.

GARRETT Z. HOUSE.

Witnesses:
EMANUEL P. LLERA,
JOHN GERMANN. (154)